US008612894B2

(12) United States Patent
Kim

(10) Patent No.: US 8,612,894 B2
(45) Date of Patent: Dec. 17, 2013

(54) METHOD FOR PROVIDING A USER INTERFACE USING THREE-DIMENSIONAL GESTURES AND AN APPARATUS USING THE SAME

(75) Inventor: Hyun Ju Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 379 days.

(21) Appl. No.: 12/577,978

(22) Filed: Oct. 13, 2009

(65) Prior Publication Data

US 2010/0095206 A1  Apr. 15, 2010

(30) Foreign Application Priority Data

Oct. 13, 2008  (KR) .................. 10-2008-0099972

(51) Int. Cl.
*G06F 3/048* (2013.01)

(52) U.S. Cl.
USPC ........................................... 715/863

(58) Field of Classification Search
USPC ........................................... 715/863
See application file for complete search history.

(56) References Cited

U.S. PATENT DOCUMENTS

| 5,838,326 | A | * | 11/1998 | Card et al. ................ 715/775 |
| 6,243,054 | B1 | | 6/2001 | DeLuca |
| 6,243,096 | B1 | * | 6/2001 | Takanashi ................ 345/419 |
| 6,559,813 | B1 | | 5/2003 | DeLuca et al. |
| 6,965,454 | B1 | | 11/2005 | Silverbrook et al. |
| 7,620,316 | B2 | | 11/2009 | Boillot |
| 7,636,088 | B2 | * | 12/2009 | Nomura et al. ............ 345/419 |
| 7,644,372 | B2 | * | 1/2010 | Russo ....................... 715/834 |
| 7,877,707 | B2 | | 1/2011 | Westerman et al. |
| 7,924,271 | B2 | | 4/2011 | Christie et al. |
| 7,930,641 | B2 | * | 4/2011 | Kohei ....................... 715/764 |
| 7,948,504 | B2 | | 5/2011 | Sheasby et al. |
| 2005/0083314 | A1 | | 4/2005 | Shalit et al. |
| 2006/0022955 | A1 | | 2/2006 | Kennedy |
| 2006/0026535 | A1 | | 2/2006 | Hotelling et al. |
| 2006/0095864 | A1 | * | 5/2006 | Mock et al. ............... 715/810 |
| 2006/0161871 | A1 | | 7/2006 | Hotelling et al. |
| 2006/0209068 | A1 | * | 9/2006 | Ajioka et al. ............. 345/427 |
| 2006/0238520 | A1 | | 10/2006 | Westerman et al. |
| 2007/0120996 | A1 | | 5/2007 | Boillot |
| 2007/0126696 | A1 | | 6/2007 | Boillot |
| 2007/0211022 | A1 | | 9/2007 | Boillot |
| 2007/0262964 | A1 | | 11/2007 | Zotov et al. |
| 2008/0052945 | A1 | | 3/2008 | Matas et al. |
| 2008/0089587 | A1 | | 4/2008 | Kim et al. |

(Continued)

FOREIGN PATENT DOCUMENTS

KR  2007035236 A  3/2007

OTHER PUBLICATIONS

International Search Report issued in Application No. PCT/KR2009/005852, mailed Jun. 17, 2010, 3 pages.

(Continued)

*Primary Examiner* — Omar Abdul-Ali
*Assistant Examiner* — Haimei Jiang
(74) *Attorney, Agent, or Firm* — Fish & Richardson P.C.

(57) ABSTRACT

Provided is a method capable of making various modifications to widgets, graphic objects, or images, which are displayed on a display device, according to motions of a plurality of input units such as finger or stylus pen, with the use of a three-dimensional multi-sensor configured to detect the motions of the input units in a space, without touching the display device.

20 Claims, 34 Drawing Sheets

(56) References Cited

U.S. PATENT DOCUMENTS

| | | |
|---|---|---|
| 2008/0094370 A1 | 4/2008 | Ording et al. |
| 2008/0100572 A1 | 5/2008 | Boillot |
| 2008/0168404 A1 | 7/2008 | Ording |
| 2008/0307364 A1* | 12/2008 | Chaudhri et al. ............. 715/836 |
| 2009/0077504 A1* | 3/2009 | Bell et al. ...................... 715/863 |
| 2009/0158220 A1* | 6/2009 | Zalewski et al. .............. 715/863 |
| 2009/0217211 A1* | 8/2009 | Hildreth et al. ............... 715/863 |
| 2009/0228841 A1* | 9/2009 | Hildreth ........................ 715/863 |
| 2010/0269060 A1* | 10/2010 | Bandholz et al. ............. 715/778 |

OTHER PUBLICATIONS

U.S. Office Action dated Jul. 3, 2013 for U.S. Appl. No. 13/206,712, 24 pages.

U.S. Office Action dated Jan. 16, 2013 for U.S. Appl. No. 13/206,712, 24 pages.

Haynes et al., Photoshop 5 Artistry, Jan. 1998, pp. 36-51, 133-137.

U.S. Office Action dated Sep. 12, 2012 for U.S. Appl. No. 13/206,712, 17 pages.

European Search Report dated Jun. 22, 2012 for Application No. EP 09820729, 7 pages.

* cited by examiner (a)          (b)          (c)

METHOD FOR PROVIDING A USER INTERFACE USING THREE-DIMENSIONAL GESTURES AND AN APPARATUS USING THE SAME

CROSS-REFERENCE TO RELATED APPLICATIONS

The present application claims priority under 35 U.S.C. 119 and 35 U.S.C. 365 to Korean Patent Application No. 10-2008-0099972 (filed on Oct. 13, 2008), which is hereby incorporated by reference in its entirety.

BACKGROUND

The present disclosure relates to a user interface controlling method.

More particularly, the present disclosure relates to a method capable of making various modifications to widgets, graphic objects, or images, which are displayed on a display device, according to motions of a plurality of input units such as finger or stylus pen, with the use of a three-dimensional (3D) multi-sensor configured to detect the motions of the input units in a space, without touching the display device.

Today, various input/output devices have been mounted on electronic systems such as TVs, mobile phones, MP3 players, PMPs, notebook computers, and PDAs.

Such input/output devices are provided to enable a user to control those systems conveniently.

Since portable devices among electronic systems, such as mobile phones, MP3 players, PMPs, notebook computers, or PDAs are small in size, there is a limitation in mounting input/output devices.

Recently, as one of efforts to improve a user interface, touchscreens, touchpads, or navigation pads have been mounted on portable devices. The adoption of the touchscreen replaces the input of mouse and keyboard in a general PC, and enables a user to input data and instructions in various manners even in a small space.

In spite of such various user interfaces, there are still many limitations in input and output of devices, and users feel inconvenient as much.

In the case of a mobile phone, various additional functions in addition to a call function tend to be added. For example, MP3 player, camera function, and Internet access function have been added.

Although it is apparent that those functions are configured to be controlled by users, there is an inconvenience in controlling those functions appropriately according to use states of devices.

SUMMARY

In one embodiment, a method for controlling a three-dimensional user interface of a display device includes: displaying one or more widgets to have predetermined depths on a display of the display device; detecting a user's gesture on a widget selected among the one or more widgets; and modifying the depths of the widgets.

In another embodiment, a method for controlling a three-dimensional user interface of a display device includes: displaying one or more widgets to have predetermined depths on a display of the display device; measuring use frequency of the widgets; and displaying the widgets while changing the depths of the widgets according to the use frequency.

In further another embodiment, a method for controlling a user interface of a display device using a gesture in a space includes: detecting a gesture of selecting a predetermined region of an image displayed on a display; detecting a motion of an input unit over the display; and modifying an image configuration of the selected region according to the detected motion.

In still further another embodiment, a display device includes: a three-dimensional proximity sensor configured to sense position and motion of at least one input unit in a space; a memory configured to store data and program necessary for operations; a display configured to display one or more widgets; and a controller configured to control the display to display a widget configuration modified according to the motion of the input unit detected by the three-dimensional proximity sensor, based on the program stored in the memory.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
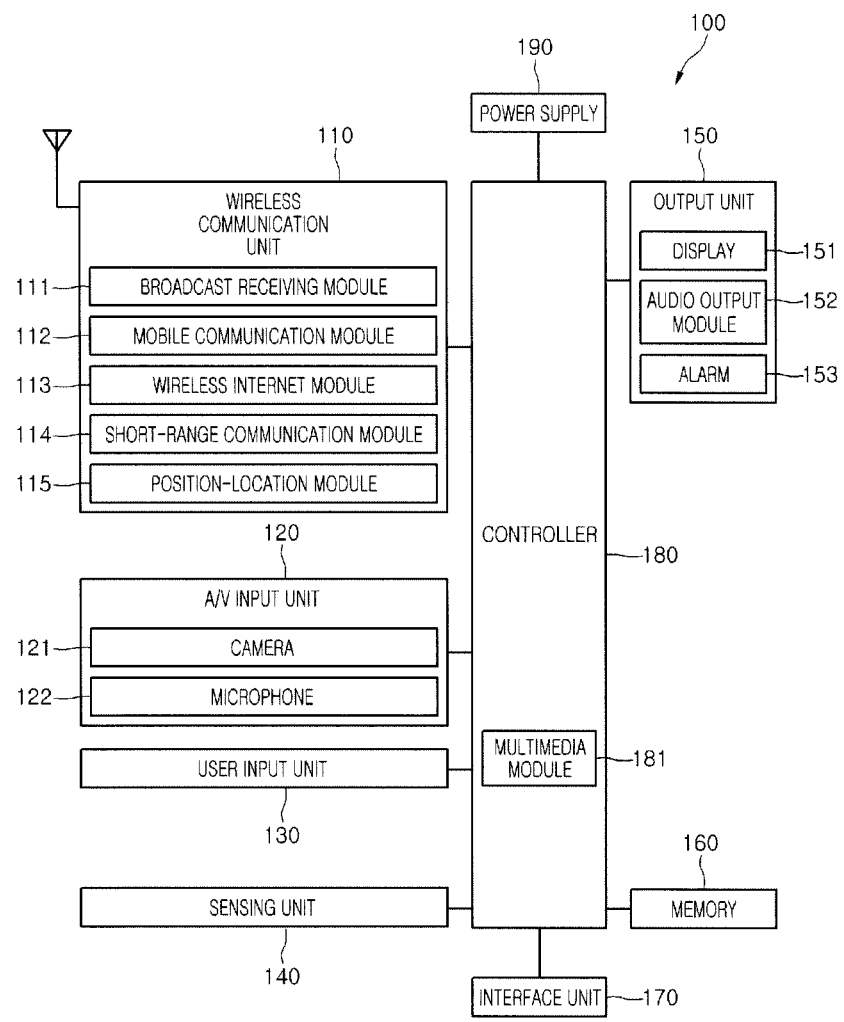
FIG. 1 is a block diagram of a mobile terminal according to an embodiment.

FIG. 1 is a block diagram of mobile terminal 100 according to an embodiment.

The mobile terminal 100 may be implemented using a variety of different types of terminals. Examples of such terminals include mobile phones, user equipment, smart phones, computers, digital broadcast terminals, personal digital assistants (PDA), portable multimedia players (PMP) and navigators.

Although the mobile terminal 100 is exemplarily described below, the following embodiments may be applied to any display devices such as non-mobile devices monitors and TVs.

By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

Also, as described later, the user input unit 130 may include a 3D proximity sensor configured to detect a user's gesture in a space. The 3D proximity sensor is configured to detect two-dimensional (2D) or 3D position of an input unit such as a finger or a stylus pen within a predetermined distance, that is, a position (xy coordinates) on display 151 and a vertical distance (z coordinate) from the display 151.

Examples of the 3D proximity sensor include an ultrasonic sensor, an infrared sensor, a capacitive touchscreen, and an image sensor. Technologies to detect position and motion of the input unit in a space using those sensors have been well known. The image sensor may include a camera which takes an image of the input unit.

In this embodiment, an example in which an ultrasonic sensor is used as the 3D sensor will be described. However, it is apparent to those skilled in the art that the invention includes the use of other sensors.

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Also, the display 151 displays a graphic object or an image as described below.

One particular implementation includes the display 151 configured as a touchscreen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

A memory 160, as described below, is configured to store data or software necessary for operation of the mobile terminal 100.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

Also, the controller 180 controls the display 151 to modify and display a structure of a graphic object or a structure of a selected image area, according to motion of the input unit in a space, which is detected by the 3D proximity sensor of the user input unit 130.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

The mobile terminal 100 of FIG. 1 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 2:
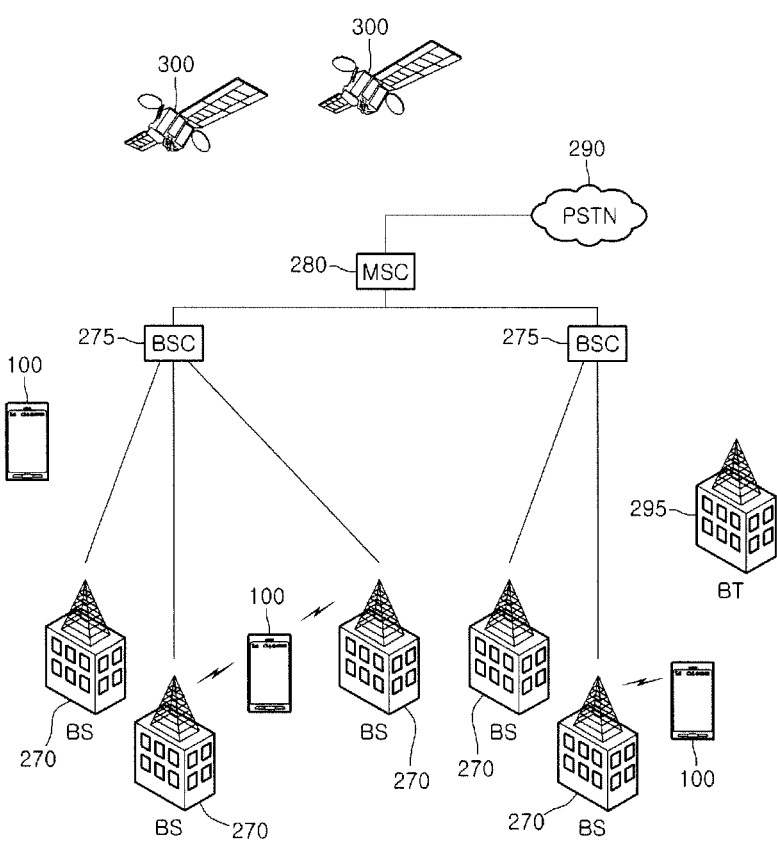
FIG. 2 is a configuration diagram of a communication system operable with the mobile terminal according to an embodiment.

Referring now to FIG. 2, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 2 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

FIGS. 3 to 7 illustrate a method for controlling widgets displayed on the mobile terminal 100 using gestures in a space according to an embodiment.

Figure 3:
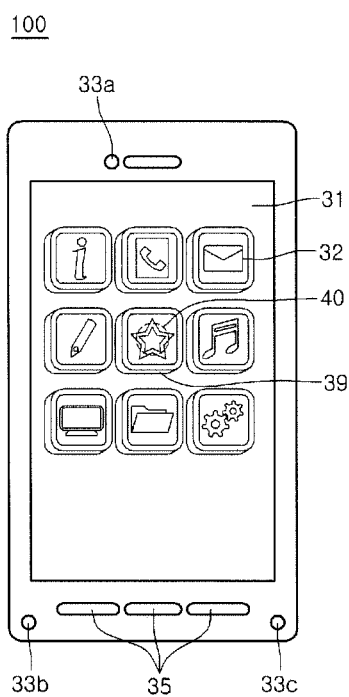
FIGS. 3 to 7 illustrate a method for controlling widgets displayed on a mobile terminal 100 using gestures in a space according to an embodiment.

FIG. 3 illustrates a mobile phone with a touchscreen as an example of the mobile terminal 100.

Touchscreen 31 may be a combination of the display 151 and the user input unit 130 of FIG. 1 and a touchpad.

A main menu is displayed on the touchscreen 31 of the mobile phone, and buttons of each menu are displayed with widgets 32. Each of the widgets 32 may be implemented with one graphic object. The widgets 32 may be buttons or shortcut buttons for executing specific applications.

In this embodiment, the widgets 32 are displayed on the touchscreen 31 in 3D images so that the widgets 32 have depths. That is, the widgets 32 are displayed so that the user can recognize the depths of the widgets 32 on the touchscreen.

Three ultrasonic sensors 33a, 33b and 33c are mounted in the vicinity of the touchscreen 31. The ultrasonic sensors 33a, 33b and 33c may implement one component of the user input unit 130 in FIG. 1. Another ultrasonic sensor may be further provided according to embodiments. The ultrasonic sensors 33a, 33b and 33c radiate ultrasonic waves and measure time taken for the ultrasonic waves to be reflected by a finger or a stylus pen and returned back. A controller (not shown) calculates 2D coordinates (xy coordinates) and 3D coordinates (z coordinate: the distance from the touchscreen 31) on the touchscreen 31, based on the measured time. In case where a plurality of fingers are detected, position of the finger nearest from the touchscreen 31 is detected.

As described above, in addition to the ultrasonic sensors, a capacitive touchscreen, an infrared sensor, and an image sensor may be used for detecting the plurality of input units.

Figure 4:
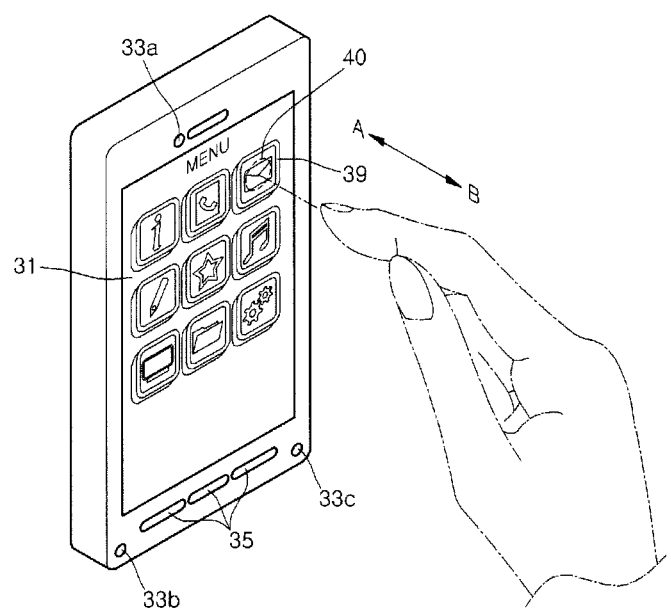

As illustrated in FIG. 4, it is assumed that the user selects one widget, for example, a widget 39 representing a text message menu, with the input unit, for example, one finger. As described later with reference to FIGS. 11 and 12, the selection of the widget 39 may be performed by touching one of the widgets 32 or using physical buttons 35.

In some embodiments, when the widget 39 is selected, the selected widget 39 may be highlighted, or may be displayed to the user visually to represent the selection of the widget 39 in various manners. The selection of the widget 39 may be recognized by the user through sounds or vibrations.

Figure 5:
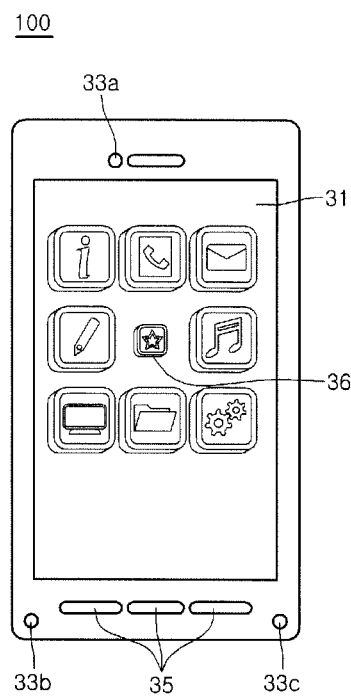
Figure 6:
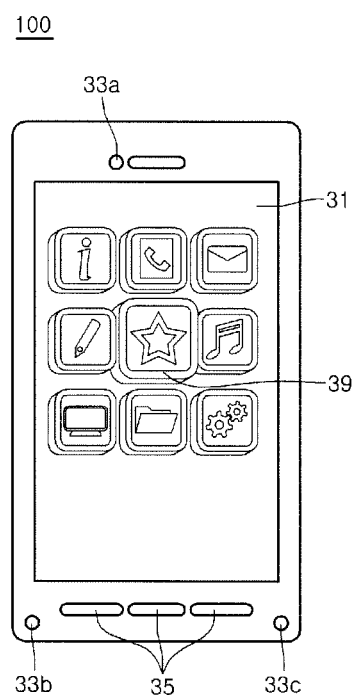

If the user moves the finger in a direction perpendicular to the touchscreen 31, that is, in A or B direction, in such a state that the widget 39 is selected, the modified depth of the selected widget 39 according to the motion of the finger is displayed. For example, when the user's finger moves in the A direction, the widget 39 may be displayed as if it is recessed from the touchscreen 31 as illustrated in FIG. 5. When the user's finger moves in the B direction, the widget 39 may be displayed as it protrudes from the touchscreen 31 as illustrated in FIG. 6. In this case, the user's finger does not touch the touchscreen 31, but merely moves in an upper space perpendicular to the widget 39 as illustrated in FIG. 4.

The depth of the widget 39 may be displayed in various manners. The widget 39 may be displayed larger than others or shadow may be displayed around the widget 39, in order to express the protruding widget 39. The widget 39 may be displayed smaller than others or shadow may be displayed around the widget 39, in order to express the recessed widget 39. A variety of known graphic processing technologies may be used to express the protruding or recessed widget 39. Any graphic processing methods may be used only if the graphic object is recognized by the user as if it protrudes or is recessed from the touchscreen 31.

Furthermore, 3D image displaying methods applicable to image display devices may be used to express the depth of the widget 39. For example, using a technology disclosed in U.S. Pat. No. 5,084,763, which generates a stereoscopic vision by combining two signals corresponding to left and right signals, or a technology disclosed in U.S. Pat. No. 5,717,415, which converts a 2D image into a 3D image, the image of the widget 39 may be generated in a 2D image and then converted into a 3D image. Moreover, the 3D image may be displayed using a technology disclosed in U.S. Patent Publication No. 2005/0088516, which displays a 2D image and a 3D image simultaneously.

Any methods may be used only if they can express the depth of the widget 39.

In some embodiments, a 2D position of the user's finger may be recognized by the user on the touchscreen 31 by displaying the 2D position of the user's finger by means of a mark.

Those embodiments may be applied to arbitrary graphic objects displayed on the touchscreen 31, as well as the widgets 32.

Figure 7:
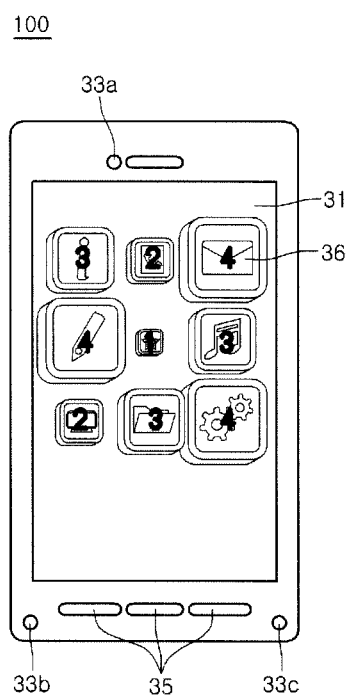

In some embodiments, the depths of the widgets 32 may be displayed with several discrete levels. For example, the depths of the widgets 32 may be classified into four levels, that is, four layers. FIG. 7 illustrates the widgets 32 with different depths. Numbers 1, 2, 3 and 4 on the widgets 32 represent the depths of the widgets 32. "2", "3", and "4" correspond to 1 layer, 2 layers, 3 layers, and 4 layers, respectively. In some embodiments, the numbers representing the depths of the widgets 32 may not be displayed on the touchscreen 31, or may be displayed blurrily or translucently. Furthermore, the depths of the widgets 32 may be displayed with colors. That is, if assigning different colors to the depths of the widgets 32, the user may recognize the depths of the widgets 32. As such, data quantity to be processed by the controller of the mobile terminal 100 may be reduced by distinguishing the depths of the widgets 32 with several discrete levels. That is, the ultrasonic sensors 33a, 33b and 33c need not measure exact z coordinates of the finger, and the data quantity to be processed may be reduced by classifying the widgets 32 into specific levels only if the detected z coordinate values are within specific ranges. Moreover, the user may more easily recognize the depths of the widgets 32 by classifying the depths of the widgets 32 with several discrete levels.

By displaying a plurality of widgets with different depths as illustrated in FIG. 7, the user may more easily distinguish the widgets visually. Widgets that are frequently used may be displayed to be more protruding, and widgets that are not frequently used may be displayed to be more recessed. Therefore, the user may more easily select the frequently used widgets.

In some embodiments, by recording the use frequencies of the widgets, that is, the user's selection frequencies of the widgets, different depths of the widgets may be automatically displayed as illustrated in FIG. 7. Accordingly, the widgets are displayed with the same depths as illustrated in FIG. 3 when the user uses the mobile terminal 100 at the first time, and thereafter, different depths as illustrated in FIG. 7 may be displayed according to the use of the mobile terminal 100.

Figure 8:
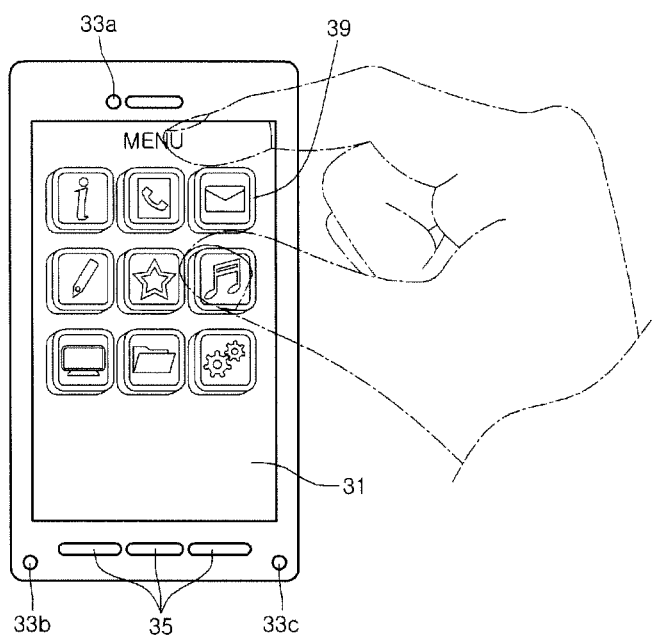
FIGS. 8 to 10 illustrate a method for controlling widgets using a plurality of input units according to an embodiment.
Figure 9:
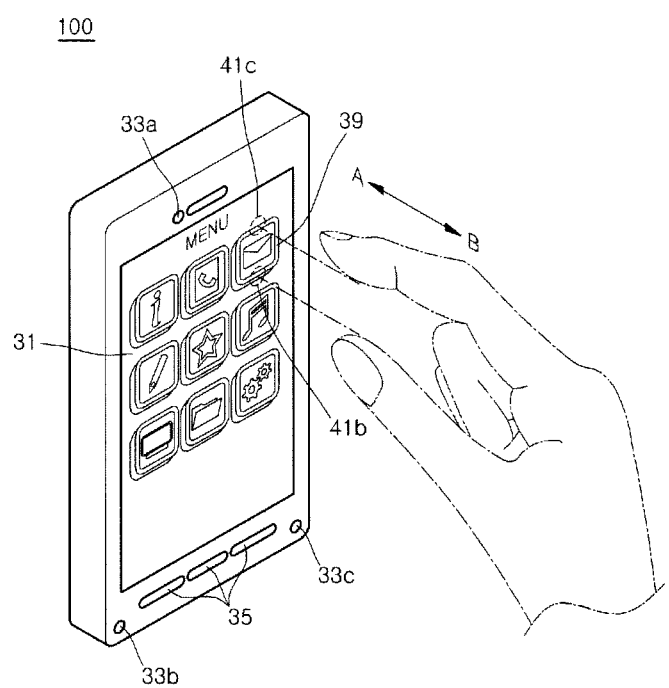
Figure 10:
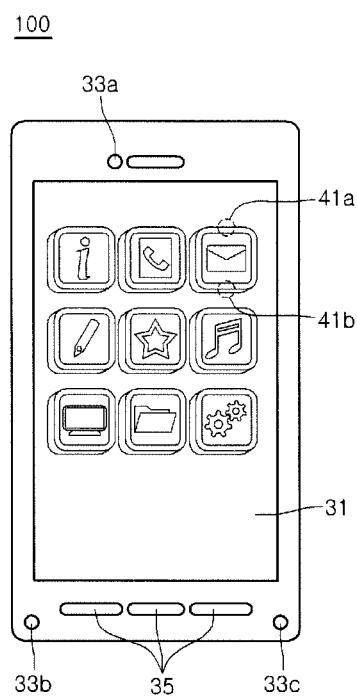

FIGS. 8 to 10 illustrate a method for controlling widgets using a plurality of input units according to an embodiment.

Like the embodiments described above with reference to FIGS. 3 to 7, three ultrasonic sensors 33a, 33b and 33c are mounted in the vicinity of the touchscreen 31 of the mobile terminal 100. The ultrasonic sensors 33a, 33b and 33c radiate ultrasonic waves and measure time taken for the ultrasonic waves to be reflected by a finger or a stylus pen and returned back. A controller (not shown) calculates 2D coordinates (xy coordinates) and 3D coordinates (z coordinate: the distance from the touchscreen 31) on the touchscreen 31, based on the measured time.

As described above, in addition to the ultrasonic sensor, a capacitive touchscreen, an infrared sensor, and an image sensor may be used to detect a plurality of input units.

A main menu is displayed on the touchscreen 31 of the mobile terminal 100, and each menu is displayed in an icon form. Each icon may be implemented with a single graphic object.

As illustrated in FIG. 8, the user may make a gesture of pinching the widget with two input units. For example, the user may make a gesture of pinching a widget 39 representing a text message menu with two fingers.

The user's fingers do not touch the touchscreen 31, but merely make a pinching gesture at a vertically upper position in the vicinity of the widget 39 in a space as illustrated in FIG. 9. 2D and 3D coordinates of the ends of the two fingers may be calculated by the ultrasonic sensors 33a, 33b and 33c. When the ends of the fingers are placed on the edges of the widget 39, it may be determined that the widget 39 is pinched.

In some embodiments, when the pinching of the widget 39 is detected, the pinching of the widget 39 may be visually displayed to the user by highlighting the surrounding of the widget 39 or other methods. The user may recognize the pinching of the widget 39 through sounds or vibrations. The widget 39 may be selected by pinching the widget 39.

As illustrated in FIG. 9, in such a state that the user pinches the widget 39, the user may move fingers in a direction perpendicular to the touchscreen 31 in a space, that is, an A or B direction.

In this case, the ultrasonic sensors 33a, 33b, and 33c may detect motions of the fingers in a perpendicular direction to the touchscreen 31 in such a state that the two fingers are placed at two positions 26a and 26b in the vicinity of the widget 39 of FIG. 9.

For example, when the fingers move in the B direction of FIG. 9, the widget 36 may be displayed to protrude from the touchscreen 31 as illustrated in FIG. 6. When the fingers move in the A direction, the widget 36 may be displayed to be recessed from the touchscreen 31 as illustrated in FIG. 5.

As illustrated in FIG. 10, marks 41a and 41b may be displayed on the touchscreen 31 in order to display 2D positions of the user's fingers.

Like the embodiments described above with reference to FIGS. 3 to 7, various graphic methods may be applied to display the widgets 36 and 39 in a protruding form.

As described above, the depths of the widgets may be expressed by expanding the sizes of the widgets or adjusting the brightness of the widgets. Furthermore, 3D technologies may be used to express the widgets in 3D images.

Figure 11:
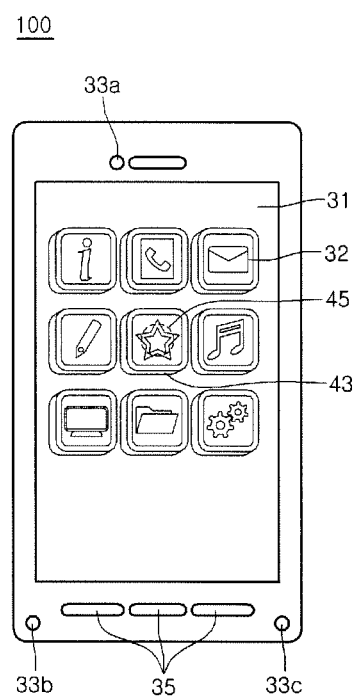
FIGS. 11 to 12 illustrate a method for selecting widgets displayed on a touchscreen using gestures in a space according to an embodiment.
Figure 12:
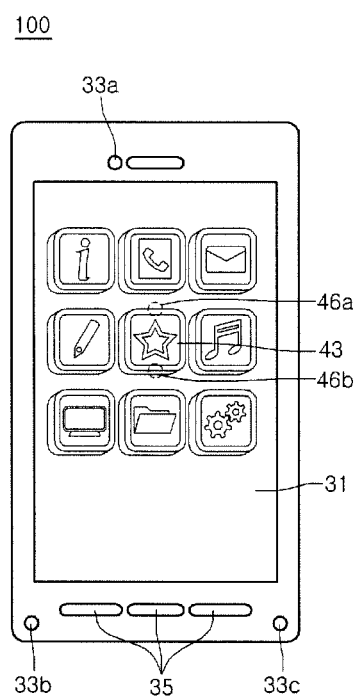

FIGS. 11 and 12 illustrate a method for selecting widgets displayed on the touchscreen 31 using gestures in a space according to an embodiment.

As illustrated in FIG. 11, when a plurality of widgets are displayed on the touchscreen 31 of the mobile terminal 100, the user may touch and select the desired widgets on the touchscreen 31. Also, when the user's finger is placed over a desired widget 43 and stays for a predetermined time, the widget 43 placed at the position 45 corresponding to the finger may be selected. The selected widget 43 may be highlighted relative to other widgets.

As illustrated in FIG. 12, the widgets may be selected using two or more fingers. The widget 43 may be selected when the user places two fingers at edges of the widget 43, without touching the widget 43, and then a predetermined time passes by. Also, the widget 43 may be selected by touching the boundary of the widget 43 with two fingers. As described above, the widget 43 may be selected by making a gesture of pinching the widget 43 at positions around the edges of the widget 43. The selected widget 43 may be highlighted. By displaying marks 46a and 46b representing positions of the fingers, the user may recognize the positions where the fingers are placed on the touchscreen 31.

The above-described widget selecting method may be applied to the selection of arbitrary graphic objects, as well as widgets.

FIGS. 13 to 18 illustrate a method for spatially rotating widgets or graphic objects displayed on a touchscreen 31 using gestures in a space according to an embodiment.

Figure 13:
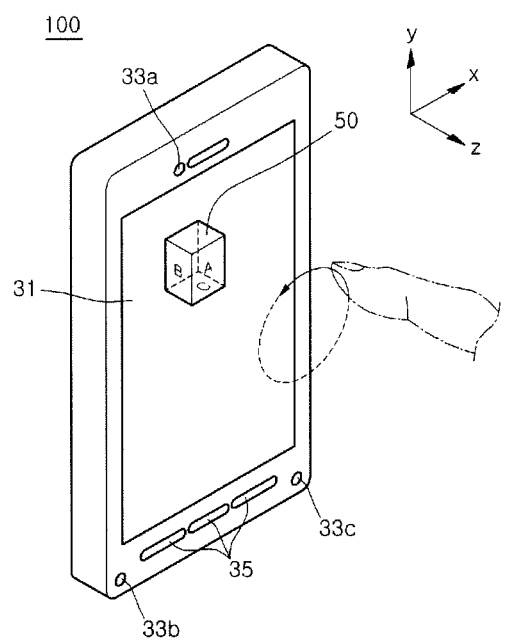
FIGS. 13 to 18 illustrate a method for spatially rotating widgets or graphic objects displayed on a touchscreen using gestures in a space according to an embodiment.

As illustrated in FIG. 13, it is assumed that a rectangular parallelepiped widget 50 or graphic object is displayed on the touchscreen 31 of the mobile terminal 100, the widget 50 may be selected in the methods described above with reference to FIGS. 11 and 12. When the widget 50 is in a selected state, the finger may rotate in parallel to the touchscreen 31 in a space corresponding to the widget 50, that is, in a space of a z-axis direction from the widget 50. The rotation of the widget 50 around a virtual axis perpendicular to the touchscreen 31, that is, a virtual axis perpendicular to a z-axis may also be displayed according to the rotation of the finger.

Figure 14:
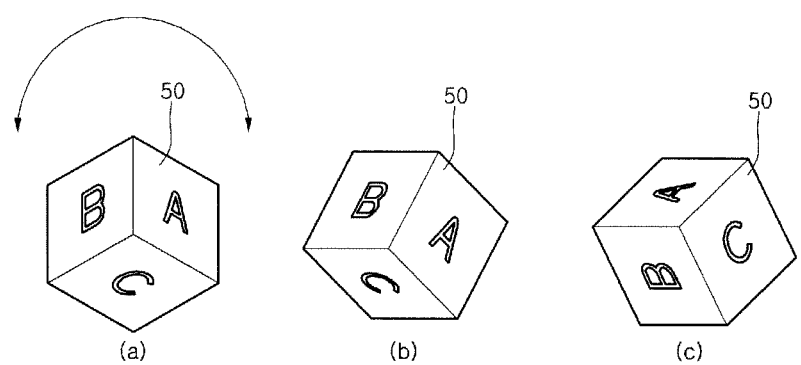

For example, as illustrated in (a) of FIG. 14, it is assumed that "A", "B" and "C" represent the front side, the left side, and the bottom side of the widget 15, respectively. If the finger rotates clockwise in a state of (a) of FIG. 14, the widget 50 rotates clockwise as illustrated in (b) of FIG. 14. Also, if the finger rotates counterclockwise in a state of (a) of FIG. 14, the widget 50 rotates counterclockwise as illustrated in (c) of FIG. 14.

Figure 15:
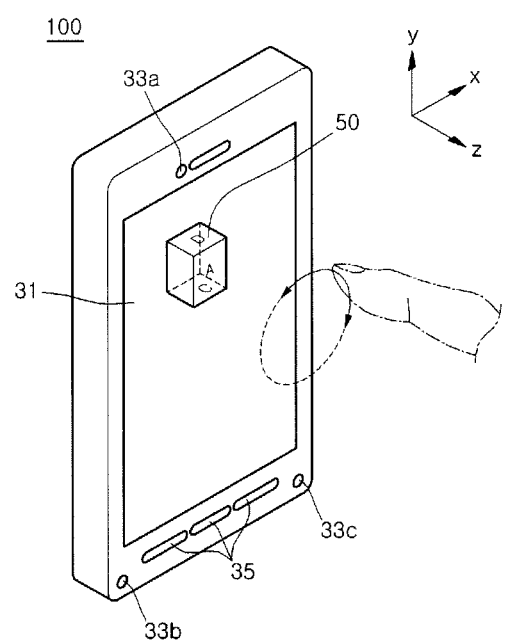

Furthermore, as illustrated in FIG. 15, the widget 50 may rotate when the finger rotate in a plane perpendicular to the touchscreen 31, that is, around a virtual axis parallel to an x-axis, in such a state that the widget 50 is selected.

Figure 16:
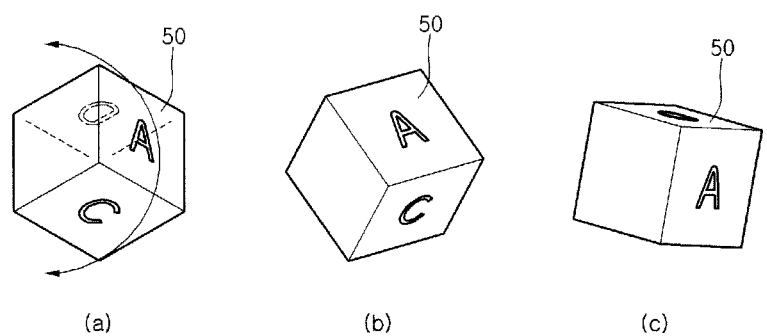

For example, as illustrated in (a) of FIG. 16, it is assumed that "A", "C" and "D" represent the front side, the bottom side, and the top side of the widget 50, respectively.

If the user rotates the finger counterclockwise in a plane perpendicular to the touchscreen 31, that is, around a virtual axis parallel to an x-axis in such a state of (a) of FIG. 16, the widget 50 rotates so that its bottom side C is shown, as illustrated in (b) of FIG. 16. If the user rotates the finger clockwise, the widget 50 rotates so that its top side D is shown.

In addition, the examples illustrated in FIGS. 13 and 15 may be combined. That is, when the user rotates the finger in a tilted direction, that is, in a direction that is neither perpendicular nor parallel to the touchscreen 31, the widget may rotate around an axis sloped with respect to the touchscreen 31 according to a rotating direction.

Figure 17:
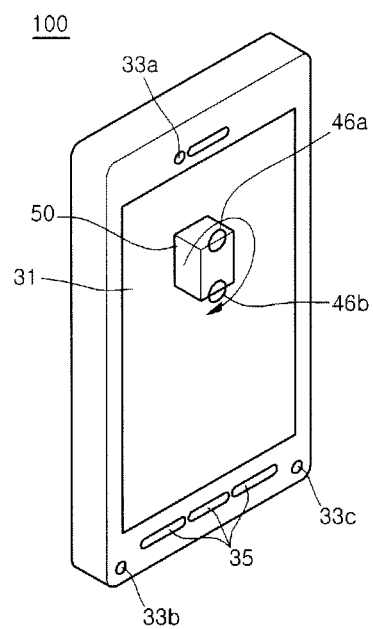

In some embodiments, when the user rotates the virtual axis perpendicular to the touchscreen 31 in a horizontal direction in such a state that the widget 50 or graphic object is pinched, as illustrated in FIG. 17, the rotation of the widget 50 around the axis on the display 31 corresponding to the vertical axis according to the rotating direction may be displayed.

Figure 18:
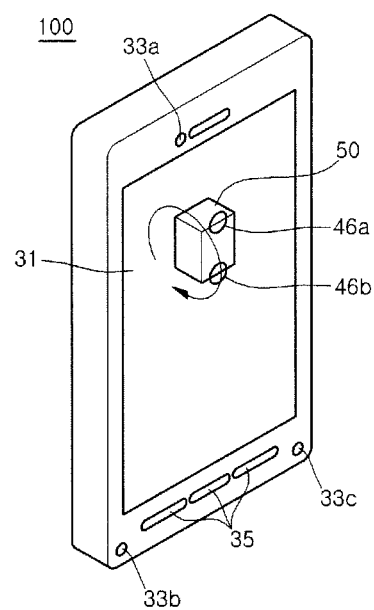

Also, in some embodiments, when the user rotates the widget 50 around the virtual axis parallel to the display 31 in such a state that the widget 50 is pinched, as illustrated in FIG. 18, the rotation of the widget 50 around the axis on the display 31 corresponding to the horizontal axis according to the rotating direction may be displayed.

Furthermore, when the user rotates the finger in an arbitrary direction in such a state that the graphic object 30 is pinched, the direction of the graphic object 30 may be rotated according to the rotating direction of the finger.

Figure 19:
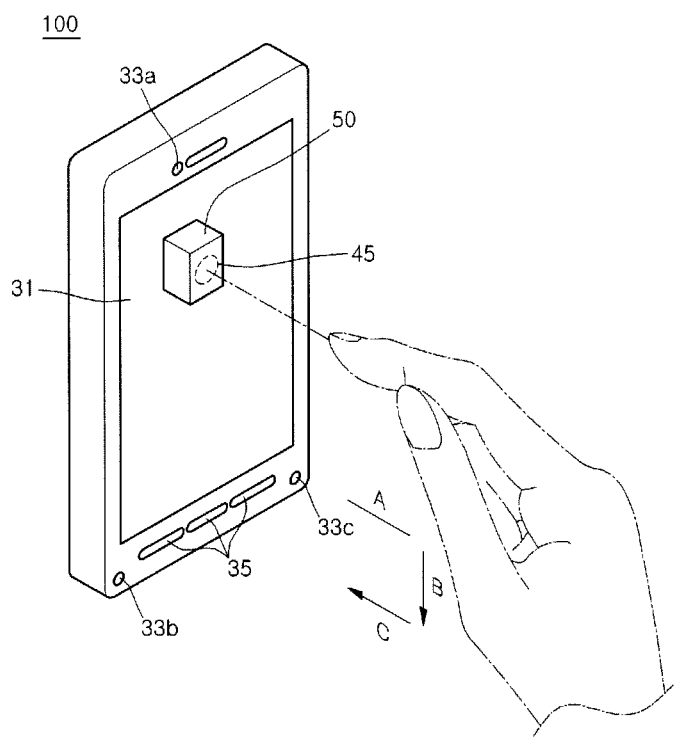
FIGS. 19 to 21 illustrate a method for moving widgets displayed on a touchscreen using gestures in a space according to an embodiment.
Figure 20:
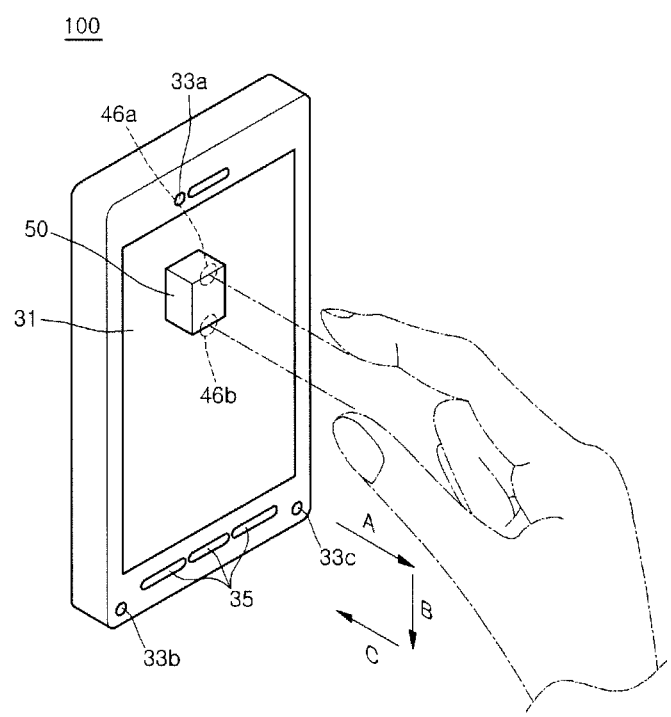
Figure 21:
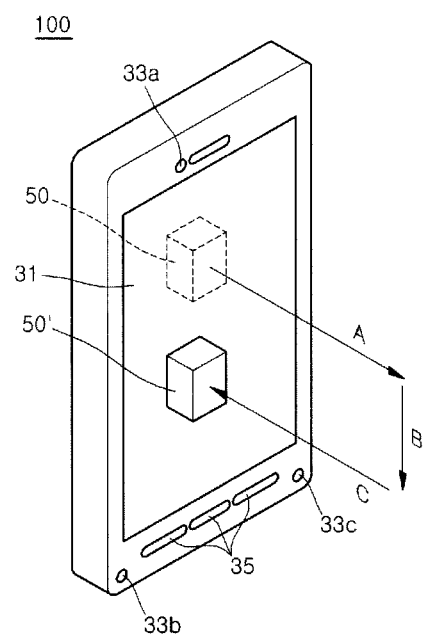

FIGS. 19 to 21 illustrate a method for moving widgets displayed on the touchscreen 31 using gestures in a space according to an embodiment.

As illustrated in FIG. 19, it is assumed that a widget 50 or graphic object is displayed on a touchscreen 31.

When the user moves the finger in arrow directions A, B and C in a space corresponding to the widget 50, the widget 50 is lifted in the A direction, moved in the B direction, and put in the C direction. That is, as illustrated in FIG. 19, the widget 50 is lifted and then placed at a different position.

Also, when the user selects the widget 50 by a pinching gesture on a space corresponding to the widget 50 and moves the pinched finger in the arrow directions A, B and C, as illustrated in FIG. 20, the widget 50 may be lifted and placed at a different position as illustrated in FIG. 21.

Therefore, according to the above-described embodiments, the widget or graphic displayed on the touchscreen 31 may be moved to a different position using gestures in a space, without touching it.

Figure 22:
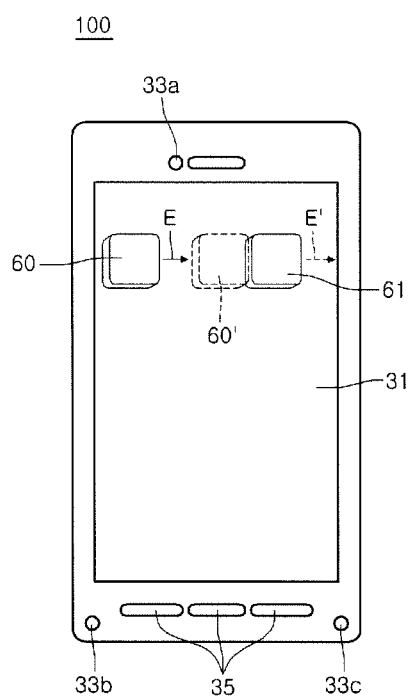
FIG. 22 illustrates throwing of widgets or graphic objects and collision feeling according to an embodiment.

FIG. 22 illustrates throwing of widgets or graphic objects and collision feeling according to an embodiment.

As illustrated in FIG. 22, it is assumed that two widgets 60 or 61 or graphic objects are displayed on the touchscreen 31 of the mobile terminal 100.

The user may select the widget 60 in the above-described manner and flick the selected widget 60 in one direction. When one finger is used, the user may flick one finger. When two fingers are used, the user may make a gesture of throwing the pinched widget 60 in one direction.

The ultrasonic sensors 33a, 33b and 33c or 3D proximity sensors mounted on the mobile terminal 100 may sense positions of the finger ends and detect the flicking gesture or throwing gesture.

For example, when the widget 60 is flicked or thrown in an arrow direction E, the widget 60 is thrown in an E direction just like a widget 60'. The throwing speed of the widget 60 may be varied according to the flicking speed or the throwing gesture speed.

The widget 60 thrown in the E direction may be collided with another widget 61. If the thrown widget 60 is collided with another widget 61, the widget 60 may stop at its position and the widget 61 may again move the E' direction. This may be displayed in the same manner as a case where an object is thrown and collided with another object in a real space. That is, the widget 61 may be moved a predetermined distance in the E' direction and then stopped.

In some embodiments, if the thrown widget 60 is placed out of the area of the touchscreen 31, it may be recognized as a command for deleting the widget 60. In this case, a confirmation message asking the user whether to delete the widget 60 or not may be outputted and then the widget may be deleted.

Also, if the widget 61 collided with the thrown widget 60 is placed out of the area of the touchscreen 31, it may be recognized as a command for deleting the widget 61.

If such an embodiment is applied to a ball-shaped graphic object, a user interface may be provided which can intuitively manipulate the menu in the mobile terminal 100. Using such an embodiment, games may be implemented.

In the above embodiment, the widgets 60 and 61 may be configured so that they are collided only when they have the same depth, and they are not collided when they have different depths.

FIGS. 23 to 29 illustrate a method for modifying images using user's gestures in a space according to an embodiment.

Figure 23:
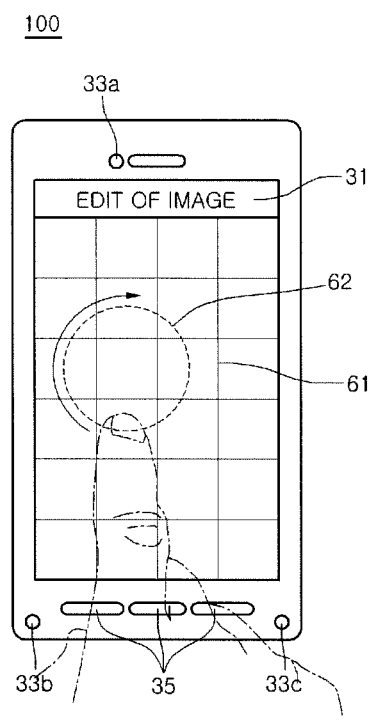
FIGS. 23 to 29 illustrate a method for modifying images using user's gestures in a space according to an embodiment.

As illustrated in FIG. 23, it is assumed that a mesh image 61 is displayed on the mobile terminal 100. The mesh image 61 is merely exemplary, and any image may be applied herein.

The user may set an edit region 62 by drawing a closed curve by dragging a finger or a stylus pen on the touchscreen 31 with the touchscreen panel, as illustrated in FIG. 23. Although the setting of a circular region 34 is illustrated in FIG. 23, an arbitrary region may be set according to the user's dragging.

When the controller of the mobile terminal 100 detects the closed curve drawn by the user's finger on the touchscreen 31 with the touchscreen panel, the region inside the closed curve may be recognized as an image edit region 62.

In another embodiment, in addition to the user's touch and dragging, the image edit region 62 may be set by gestures in a space. For example, if the user draws a closed curve in a space, a region formed by projecting the closed curve onto the touchscreen 31 may be recognized as the edit region 62.

Figure 24:
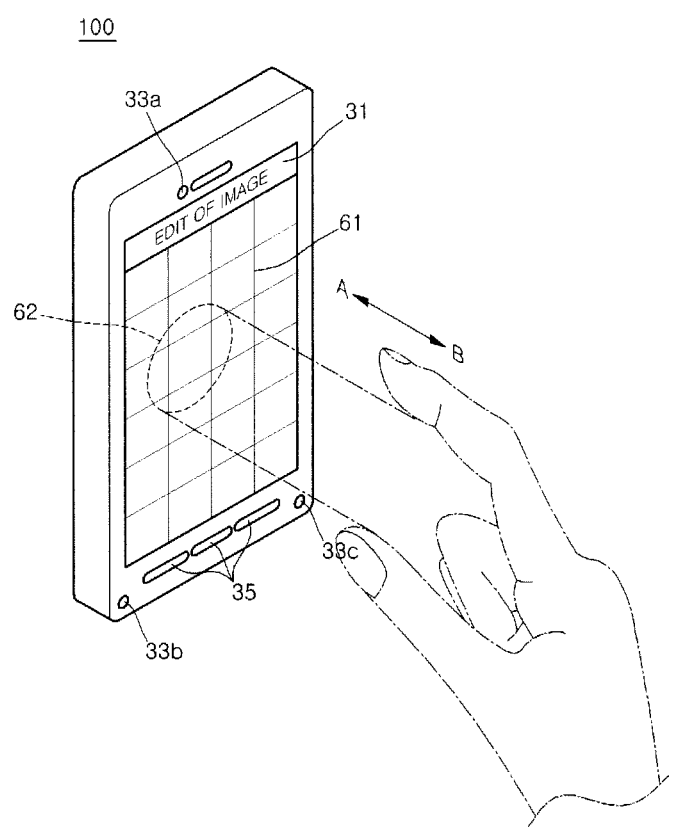

After setting the edit region 62, if the user pinches positions corresponding to the vertical upper region of the boundary of the edit region 62 with two fingers, without touching the touchscreen 31, as illustrated in FIG. 24, the 3D proximity sensor of the mobile terminal 100 recognizes the gesture, and the controller recognizes that the edit region 62 is pinched. Like the above-described embodiment, the pinching of the edit region 62 may be recognized by placing the finger over the edge of the edit region 62, or when the pinching gesture over the edge of the edit region 62 is detected.

In a pinched state, the user may move the finger in a direction perpendicular to the touchscreen 31, that is, the A or B direction.

Figure 25:
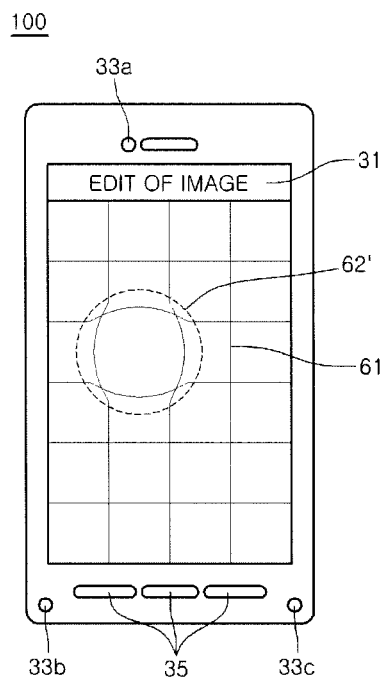
Figure 26:
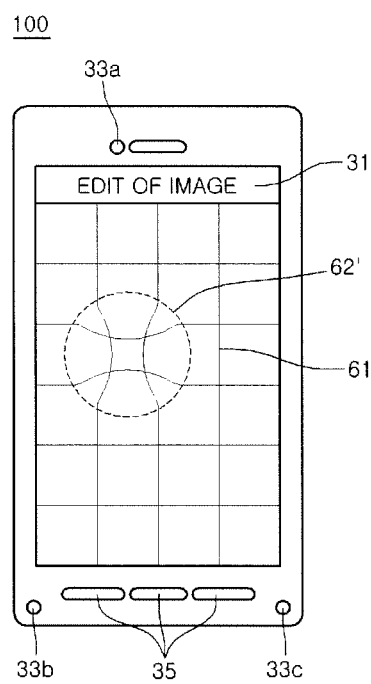

If the user moves the finger in the B direction, that is, a direction far away from the touchscreen 31, the center point of the edit region 62 may be displayed as if it rises upward from the touchscreen 31 as illustrated in FIG. 25. On the other hand, if the user moves the finger in the A direction, that is, a direction approaching to the touchscreen 31, the center point of the manipulation region 62 may be displayed as if it settles down as illustrated in FIG. 26.

If the gesture illustrated in FIG. 24 is detected, the controller of the display device 30 modifies the configuration of the edit region 62 as if the center of the edit region 62 selected by the controller of the display device 30 rises upward or settles down.

In some embodiments, it may be configured to perform the above operation when the user moves one finger in the A or B direction in a vertical upper space of the edit region 62, as illustrated in FIG. 24.

The above operation may be implemented in the following manner. An image to be edited is overlapped on a virtual plane mesh. As the center point of the edit region 62 selected in the image to be edited moves, specific positions (vertexes) related to the center point move along the movement of the center point. The vertexes related to the center point may be set as predetermined patterns or may be set adaptively according to images.

In some embodiments, when the rising degree or the settling degree is slight, a bump map may be overlapped on the edit region 62.

Such an image editing method is used in 3D MAXs or Maya, which is a known 3D image editing tool. A variety of image editing methods are known, and arbitrary image editing methods may be used herein.

After the edit region 62 is edited in the above manner, the controller of the mobile terminal 100 generates a new image by overlapping the edit region 62 in the original region.

Figure 27:
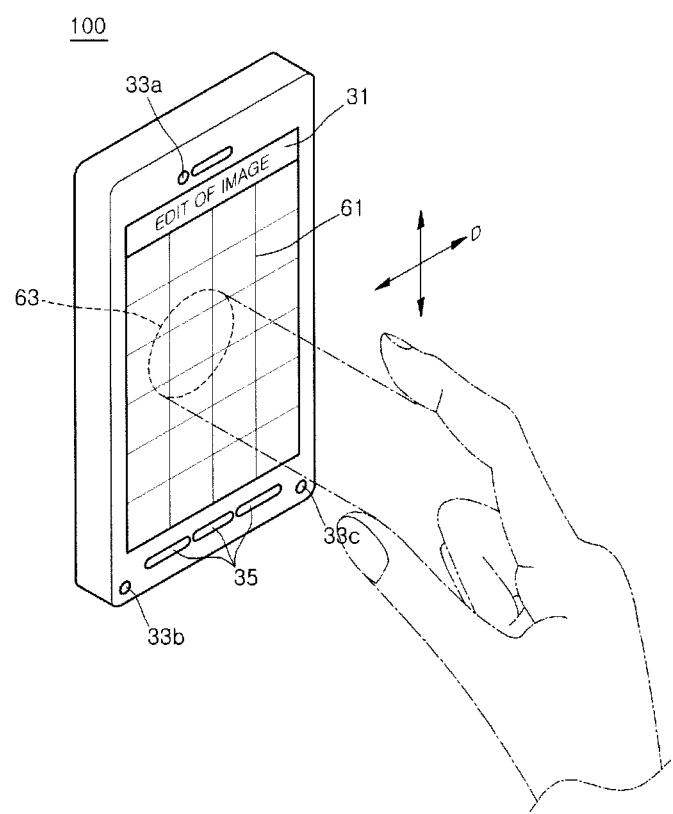
Figure 28:
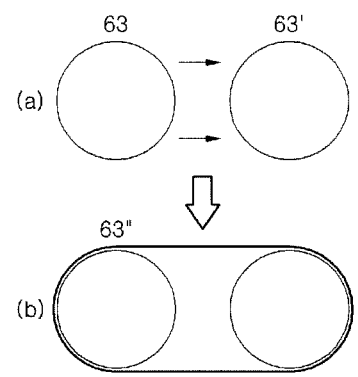
Figure 29:
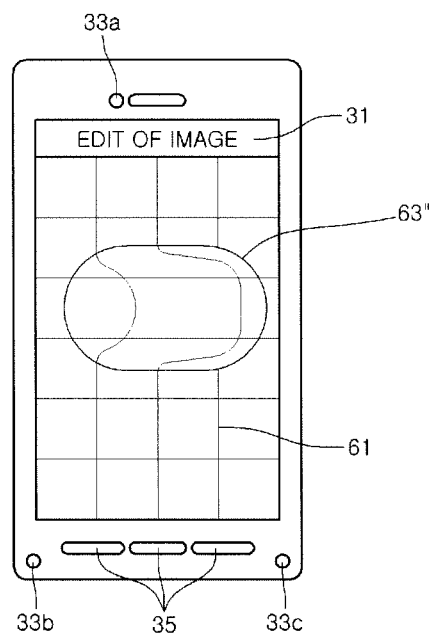

In another embodiment, the user may edit the image using gestures in a space. FIGS. 27 to 29 illustrate an image editing method according to an embodiment.

Like the above-described example, it is assumed that a mesh image 61 is displayed on the mobile terminal 100.

Like the above-described embodiment, the user may set an edit region 62 by drawing a closed curve by dragging a finger or a stylus pen on the touchscreen 31 with the touchscreen panel.

After setting the edit region 62, if the user pinches positions corresponding to the vertical upper region of the boundary of the edit region 62 with two fingers, without touching the touchscreen 31, as illustrated in FIG. 27, the 3D proximity sensor of the mobile terminal 100 recognizes the gesture, and the controller recognizes that the edit region 62 is pinched.

After that, if the user moves the finger in a horizontal direction to the touchscreen 31, the edit region 62 may expand in a horizontal direction to the touchscreen 31.

If the user moves the finger in the D direction of FIG. 27 while grasping the edit region 62, the edit region 62 expands in the D direction. Herein, the term "expand" means that the image expands only in the D direction, as described later.

As illustrated in FIG. 28, when it is assumed that the user moves the finger from the original position 36 to a position 36' in a horizontal direction, a new region 36" including both the original position 36 and the moved position 36' becomes a new edit region 62.

In this case, as illustrated in FIG. 27, images contained in the original edit region 62 expand in a finger moving direction, that is, the D direction of FIG. 25. The expanded region 36" is overlapped on the original image. The controller of the mobile terminal 100 generates a new image by overlapping the expanded region 36" on the original image. It may be visually recognized as if the edit region 62 expands in a finger moving direction.

Although the example where the image is modified in a direction perpendicular to the touchscreen 31 has been described with reference to FIGS. 23 to 26 and the example where the image is modified in a direction horizontal to the touchscreen 31 has been described with reference to FIGS. 27 to 29, the invention may also be applied to a case where the user moves the image in a direction oblique to the touchscreen 31 in such a state that the edit region is pinched, that is, in a case where a vertical component and a horizontal component are combined.

That is the case where the user moves the finger in a direction oblique to the touchscreen 31 in such a state the edit region is pinched, the edit region may be displayed as if it rises upward or settles down in a vertical direction and simultaneously expands in a horizontal direction.

FIGS. 30 to 34 illustrate examples in which the above-described embodiments are applied to human being's face images.

Figure 30:
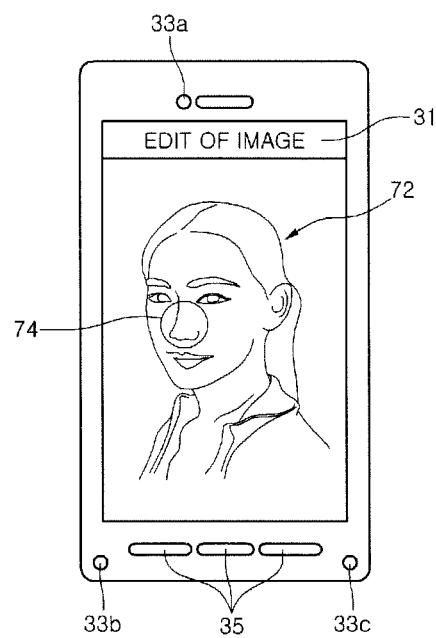
FIGS. 30 to 34 illustrate examples in which the foregoing embodiments are applied to human being's face images.
Figure 31:
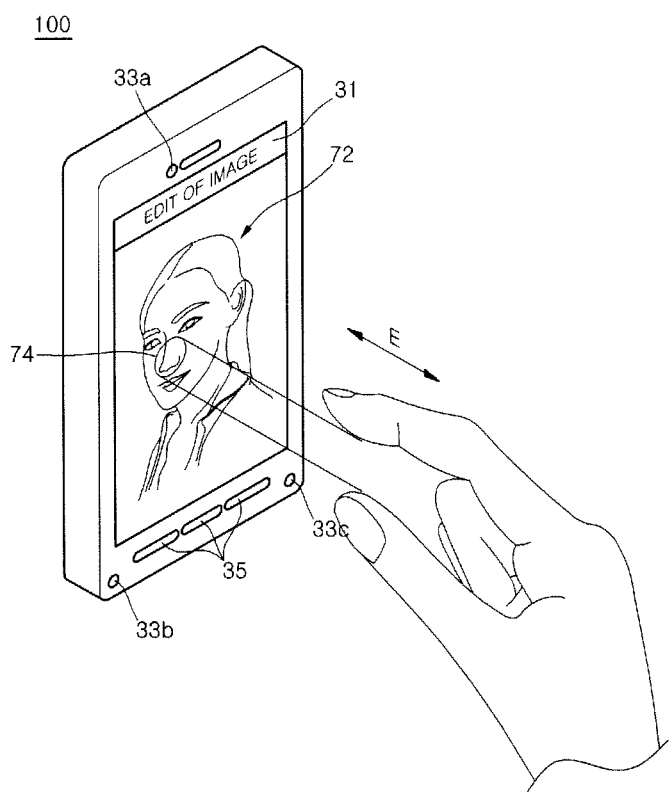

It is assumed that a woman's face 72 is displayed on the mobile terminal 100 as illustrated in FIG. 30. Also, it is assumed that the user sets a woman's nose as an edit region 74.

If the user pinches the edit region 74 in a space and moves the fingers in an E direction perpendicular to the touchscreen 31 in the pinched state, the center point of the edit region 74 is displayed as if it rises upward from the center or settles down.

Figure 32:
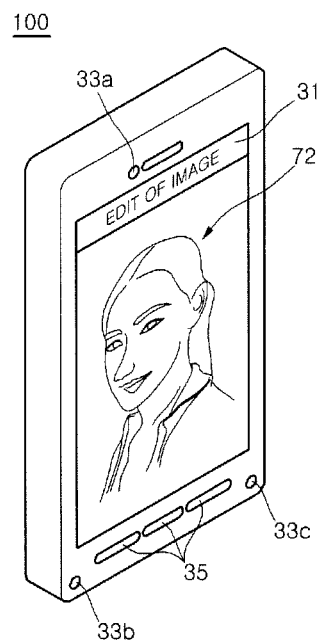
Figure 33:
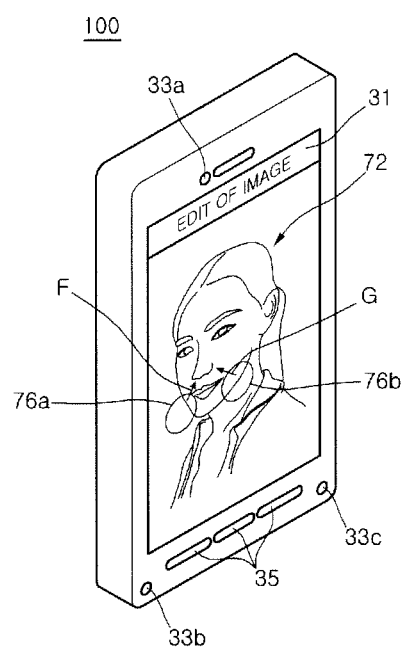

For example, when the finger moves far from the touchscreen 31, the nose may be displayed as if it is sharpened as illustrated in FIG. 32.

Figure 34:

Also, if the user sets both cheek regions of the woman's face as the edit regions 76a and 76b and moves the fingers in the F and G directions in a space, the image expands in the moving direction and is displayed as if the cheek regions are contracted as illustrated in FIG. 34.

Therefore, the user may edit the images through the intuitive manipulation, as the user wants, without expert knowledge of image files.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a user interface of a mobile device, the method comprising:
controlling display, on a user interface of a mobile device, of a main menu including widgets that each have a depth within a three-dimensional menu space and that each control execution of a specific application on the mobile device;
selecting, from among the widgets in the main menu and in a manner that does not cause execution of a specific application on the mobile device, a widget;
at a time when the widget is selected, detecting, by a controller, a user's gesture related to modifying a depth of the selected widget within the three-dimensional menu space of the main menu; and
based on detecting the user's gesture related to modifying the depth of the selected widget, modifying, on the user interface of the mobile device, the depth of the selected widget within the three-dimensional menu space of the main menu such that, when the mobile device displays the main menu, the selected widget is displayed within the three-dimensional menu space of the main menu at the modified depth, which is different than depths of other widgets within the three-dimensional menu space of the main menu.

2. The method according to claim 1:
wherein detecting a user's gesture related to modifying a depth of the selected widget comprises detecting a gesture of changing a distance between a user input unit and the mobile device in a space over the selected widget; and
wherein modifying, on the user interface of the mobile device, the depth of the selected widget comprises modifying, on the user interface of the mobile device, the depth of the selected widget based on detecting the gesture of changing the distance between the user input unit and the mobile device in the space over the selected widget.

3. The method according to claim 2:
wherein detecting a gesture of changing a distance between a user input unit and the mobile device in a space over the selected widget comprises detecting a gesture of approaching at least one user input unit to the mobile device or departing the at least one user input unit from the mobile device; and
wherein modifying, on the user interface of the mobile device, the depth of the selected widget comprises modifying, on the user interface of the mobile device, the depth of the selected widget based on detecting the gesture of approaching at least one user input unit to the mobile device or departing the at least one user input unit from the mobile device.

4. The method according to claim 1, further comprising:
detecting a user's gesture of rotating at least one user input unit in a space over the selected widget; and
rotating the selected widget according to the user's gesture of rotating.

5. The method according to claim 1:
wherein controlling display, on a user interface of a mobile device, of a main menu including widgets that each have a depth within a three-dimensional menu space comprises controlling display, on a user interface of a mobile device, of a main menu including widgets that have different sizes; and
wherein modifying, on the user interface of the mobile device, the depth of the selected widget comprises modifying, on the user interface of the mobile device, a size of the selected widget such that, when the mobile device displays the three-dimensional menu space of the main menu, the selected widget is displayed within the three-dimensional menu space of the main menu at the modified size, which is different than sizes of other widgets within the three-dimensional menu space of the main menu.

6. The method according to claim 1:
wherein controlling display, on a user interface of a mobile device, of a main menu including widgets that each have a depth within a three-dimensional menu space comprises controlling display, on a user interface of a mobile device, of a main menu including widgets that have different shadows; and
wherein modifying, on the user interface of the mobile device, the depth of the selected widget comprises modifying, on the user interface of the mobile device, a shadow of the selected widget such that, when the mobile device displays the three-dimensional menu space of the main menu, the selected widget is displayed within the three-dimensional menu space of the main menu with the modified shadow, which is different than shadows of other widgets within the three-dimensional menu space of the main menu.

7. The method of claim 1:
wherein controlling display, on a user interface of a mobile device, of a main menu including widgets that each have a depth within a three-dimensional menu space comprises controlling display, on a user interface of a mobile device, of a main menu including widgets using at least three discrete levels of depth within the three-dimensional menu space, each of the at least three discrete levels of depth representing a different predetermined depth within the three-dimensional menu space; and
wherein modifying, on the user interface of the mobile device, the depth of the selected widget comprises changing, on the user interface of the mobile device, in which of the at least three discrete levels of depth the selected widget is classified such that, when the mobile device displays the three-dimensional menu space of the main menu, the selected widget is displayed within the main menu at the changed level of depth, which is different than levels of depth of other widgets within the three-dimensional menu space of the main menu.

8. A device comprising:
a controller; and
a memory coupled to the controller having stored thereon instructions which, when executed by the controller, causes the controller to perform operations comprising:
controlling display, on a user interface of a mobile device, of a main menu including widgets that each have a depth within a three-dimensional menu space and that each control execution of a specific application on the mobile device;
selecting, from among the widgets in the main menu and in a manner that does not cause execution of a specific application on the mobile device, a widget;
at a time when the widget is selected, detecting a user's gesture related to modifying a depth of the selected widget within the three-dimensional menu space of the main menu; and
based on detecting the user's gesture related to modifying the depth of the selected widget, modifying, on the user interface of the mobile device, the depth of the selected widget within the three-dimensional menu space of the main menu such that, when the mobile device displays the main menu, the selected widget is displayed within the three-dimensional menu space of the main menu at the modified depth, which is different than depths of other widgets within the three-dimensional menu space of the main menu.

9. The device according to claim 8:
wherein detecting a user's gesture related to modifying a depth of the selected widget comprises detecting a gesture of changing a distance between a user input unit and the mobile device in a space over the selected widget; and
wherein modifying, on the user interface of the mobile device, the depth of the selected widget comprises modifying, on the user interface of the mobile device, the depth of the selected widget based on detecting the gesture of changing the distance between the user input unit and the mobile device in the space over the selected widget.

10. The device according to claim 9:
wherein detecting a gesture of changing a distance between a user input unit and the mobile device in a space over the selected widget comprises detecting a gesture of approaching at least one user input unit to the mobile device or departing the at least one user input unit from the mobile device; and
wherein modifying, on the user interface of the mobile device, the depth of the selected widget comprises modifying, on the user interface of the mobile device, the depth of the selected widget based on detecting the gesture of approaching at least one user input unit to the mobile device or departing the at least one user input unit from the mobile device.

11. The device according to claim 8, wherein the operations further comprise:
detecting a user's gesture of rotating at least one user input unit in a space over the selected widget; and
rotating the selected widget according to the user's gesture of rotating.

12. The device according to claim 8:
wherein controlling display, on a user interface of a mobile device, of a main menu including widgets that each have a depth within a three-dimensional menu space comprises controlling display, on a user interface of a mobile device, of a main menu including widgets that have different sizes; and
wherein modifying, on the user interface of the mobile device, the depth of the selected widget comprises modifying, on the user interface of the mobile device, a size of the selected widget such that, when the mobile device displays the three-dimensional menu space of the main menu, the selected widget is displayed within the three-dimensional menu space of the main menu at the modified size, which is different than sizes of other widgets within the three-dimensional menu space of the main menu.

13. The device according to claim 8:
wherein controlling display, on a user interface of a mobile device, of a main menu including widgets that each have a depth within a three-dimensional menu space comprises controlling display, on a user interface of a mobile device, of a main menu including widgets that have different shadows; and
wherein modifying, on the user interface of the mobile device, the depth of the selected widget comprises modifying, on the user interface of the mobile device, a shadow of the selected widget such that, when the mobile device displays the three-dimensional menu space of the main menu, the selected widget is displayed within the three-dimensional menu space of the main menu with the modified shadow, which is different than shadows of other widgets within the three-dimensional menu space of the main menu.

14. The device according to claim 8:
wherein controlling display, on a user interface of a mobile device, of a main menu including widgets that each have a depth within a three-dimensional menu space comprises controlling display, on a user interface of a mobile device, of a main menu including widgets using at least three discrete levels of depth within the three-dimensional menu space, each of the at least three discrete levels of depth representing a different predetermined depth within the three-dimensional menu space; and
wherein modifying, on the user interface of the mobile device, the depth of the selected widget comprises changing, on the user interface of the mobile device, in which of the at least three discrete levels of depth the selected widget is classified such that, when the mobile device displays the three-dimensional menu space of the main menu, the selected widget is displayed within the main menu at the changed level of depth, which is different than levels of depth of other widgets within the three-dimensional menu space of the main menu.

15. The method according to claim 1, wherein modifying, on the user interface of the mobile device, the depth of the selected widget further comprises modifying an area on the user interface of the mobile device at which the selected widget is pressed to cause execution of a specific application on the mobile device associated with the selected widget.

16. The device according to claim 8, wherein modifying, on the user interface of the mobile device, the depth of the selected widget further comprises modifying an area on the user interface of the mobile device at which the selected widget is pressed to cause execution of a specific application on the mobile device associated with the selected widget.

17. The method according to claim 1, further comprising:
detecting a user's gesture of rotating at least one user input unit in a space over the selected widget;
determining whether a direction of rotation of the at least one user input unit in the space over the selected widget is in:
a first plane perpendicular to the user interface,
a second plane parallel to the user interface, or
a third plane that is tilted with respect to the user interface such that the third plane is neither perpendicular nor parallel to the user interface;
based on determining that the direction of rotation of the at least one user input unit in the space over the selected widget is in the first plane perpendicular to the user interface, rotating the selected widget, according to the user's gesture of rotating, about a first virtual axis parallel to the user interface;
based on determining that the direction of rotation of the at least one user input unit in the space over the selected widget is in the second plane parallel to the user interface, rotating the selected widget, according to the user's gesture of rotating, about a second virtual axis perpendicular to the user interface; and
based on determining that the direction of rotation of the at last one user input unit in the space over the selected widget is in the third plane that is tilted with respect to the user interface, rotating the selected widget, according to the user's gesture of rotating, about a third virtual axis sloped with respect to the user interface.

18. The method according to claim 1, wherein selecting the widget comprises selecting a widget that is defined as a rectangular parallelepiped widget, further comprising:
detecting a user's gesture of rotating at least one user input unit in a space over the selected widget; and
in response to detecting the user's gesture of rotating at least one user input unit in the space over the selected widget:
rotating the rectangular parallelepiped widget about an axis to change, from a first side of the rectangular parallelepiped widget, to a second side of the rectangular parallelepiped widget, and
modifying, on the user interface of the mobile device, a display of the selected widget such that, when the mobile device displays the three-dimensional menu space of the main menu, the selected widget is displayed within the three-dimensional menu space of the main menu at the second side of the rectangular parallelepiped widget, rather than the first side of the rectangular parallelepiped widget.

19. The device according to claim 8, further comprising:
detecting a user's gesture of rotating at least one user input unit in a space over the selected widget;
determining whether a direction of rotation of the at least one user input unit in the space over the selected widget is in:
a first plane perpendicular to the user interface,
a second plane parallel to the user interface, or
a third plane that is tilted with respect to the user interface such that the third plane is neither perpendicular nor parallel to the user interface;
based on determining that the direction of rotation of the at least one user input unit in the space over the selected widget is in the first plane perpendicular to the user interface, rotating the selected widget, according to the user's gesture of rotating, about a first virtual axis parallel to the user interface;
based on determining that the direction of rotation of the at least one user input unit in the space over the selected widget is in the second plane parallel to the user interface, rotating the selected widget, according to the user's gesture of rotating, about a second virtual axis perpendicular to the user interface; and
based on determining that the direction of rotation of the at last one user input unit in the space over the selected widget is in the third plane that is tilted with respect to the user interface, rotating the selected widget, according to the user's gesture of rotating, about a third virtual axis sloped with respect to the user interface.

20. The device according to claim 8, wherein selecting the widget comprises selecting a widget that is defined as a rectangular parallelepiped widget, further comprising:
detecting a user's gesture of rotating at least one user input unit in a space over the selected widget; and
in response to detecting the user's gesture of rotating at least one user input unit in the space over the selected widget:
rotating the rectangular parallelepiped widget about an axis to change, from a first side of the rectangular parallelepiped widget, to a second side of the rectangular parallelepiped widget, and
modifying, on the user interface of the mobile device, a display of the selected widget such that, when the mobile device displays the three-dimensional menu space of the main menu, the selected widget is displayed within the three-dimensional menu space of the main menu at the second side of the rectangular parallelepiped widget, rather than the first side of the rectangular parallelepiped widget.

* * * * *